United States Patent [19]

Myers et al.

[11] 4,082,294
[45] Apr. 4, 1978

[54] CLEANING AND STATIC-REMOVING DEVICE FOR GRAMOPHONE RECORDS

[75] Inventors: Mark Stanley Myers, London; Richard George Bowler, Bengeo, both of England

[73] Assignee: Metrosound Audio Products Ltd., England

[21] Appl. No.: 733,534

[22] Filed: Oct. 18, 1976

[30] Foreign Application Priority Data

Mar. 31, 1976 United Kingdom ............... 12959/76

[51] Int. Cl.² ............................................. G11B 3/58
[52] U.S. Cl. ...................................................... 274/47
[58] Field of Search ................. 274/47; 15/246, 256.5

[56] References Cited

U.S. PATENT DOCUMENTS

| 3,599,988 | 8/1971 | Norris | 274/15 R X |
| 3,822,065 | 7/1974 | Arbib | 274/47 |
| 3,945,647 | 3/1976 | Rangabe | 274/47 |

FOREIGN PATENT DOCUMENTS

| 625,239 | 3/1959 | Italy | 274/47 |
| 373,366 | 5/1932 | United Kingdom | 274/47 |

*Primary Examiner*—Charles E. Phillips
*Attorney, Agent, or Firm*—William Anthony Drucker

[57] ABSTRACT

A device for cleaning and for removing static from revolving gramophone records is mounted on a deck radially beyond the turn-table and has a horizontal guide which can be swung laterally over the record, a slider carrying a cleaning element and/or a static removing element being movable along the guide as a result of engagement with the grooving of the record.

3 Claims, 5 Drawing Figures

CLEANING AND STATIC-REMOVING DEVICE FOR GRAMOPHONE RECORDS

This invention relates to the cleaning and removal of static from gramophone records, and more particularly during the playing of the record.

OBJECT OF THE INVENTION

The object of the invention is to provide an improved device for this purpose which, whilst being capable of tracking completely across the grooved area of a gramophone record, is of relatively small bulk and can be readily moved into and out of a stored position of non-use, and an operative position extended across the record.

SUMMARY OF THE INVENTION

According to the present invention a device for cleaning and removal of static electricity from a gramophone record when the record is on a record playing apparatus having a turntable rotatable with respect to a deck, comprises a mount for standing or securing on the deck in a position radially beyond the edge of the turntable, a carrier supported on the mount and including guide means which when the device is so mounted may be positioned to extend laterally over the turntable, a slider movable on the guide means substantially radially with respect to the mount, and cleaning and/or static-removing means on the slider adapted to engage in the grooved surface of a record and to cause the slider to track across the record as the record revolves.

The carrier is preferably adjustable in relation to the mount, in the direction towards and away from the deck, e.g. the mount includes a vertical stem and the carrier includes a block which is slidable on the stem, means being provided for retaining the block at any selected position along the stem. The carrier is also preferably adjustable in relation to the mount, in a plane substantially parallel to the deck, to permit the carrier and slider to be swung into and out of a position in which the guide means are presented substantially radially across the record surface. In a preferred form of construction, the mount includes a base for securing to the deck, and the stem is rotatable with respect to the base.

The guide means may advantageously comprise a pair of parallel spaced rods, the slider including an upper portion extending between the rods and carrying slider elements each resting on both rods.

The slider may include a first portion, and a second portion movable with respect to the first portion, e.g. by pivoting in a direction towards and away from the deck, one of said portions carrying a cleaning element for the grooves of a record, e.g. a tuft of bristles or other means for engaging into the grooves of the record, and the other of said portions carrying a device for removal of static electricity, e.g. a rotatable fabric-covered roller.

BRIEF DESCRIPTION OF THE DRAWINGS

In order that the nature of the invention may be readily ascertained, an embodiment of record-cleaning and static-removing device in accordance therewith is hereinafter particularly described with reference to the accompanying drawings, wherein.

DESCRIPTION OF THE PREFERRED EMBODIMENT

Figure 1:
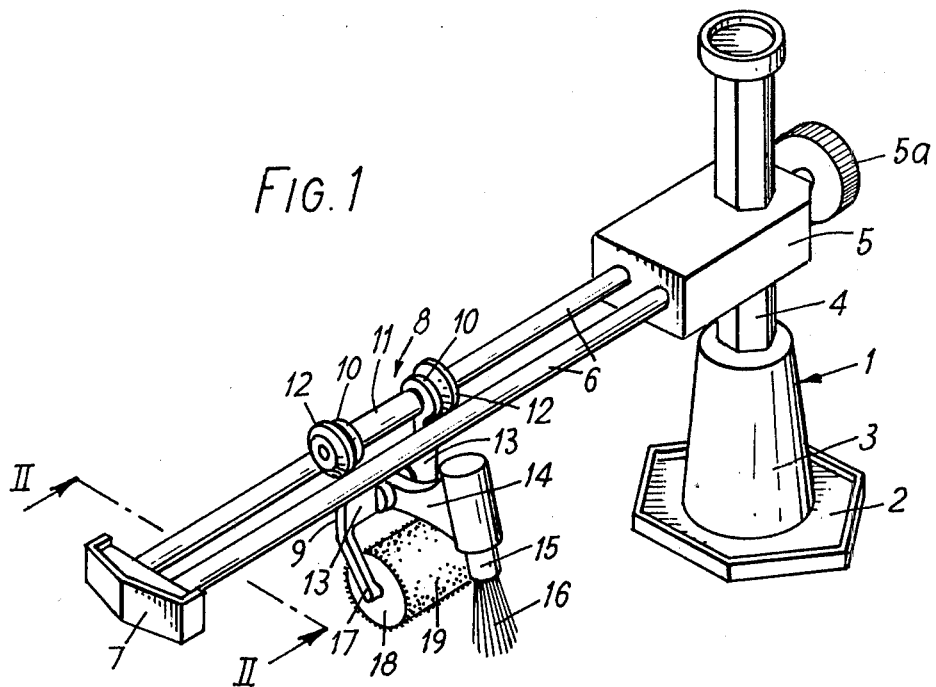
FIG. 1 is a perspective elevation of the device.
Figures 2, 3:
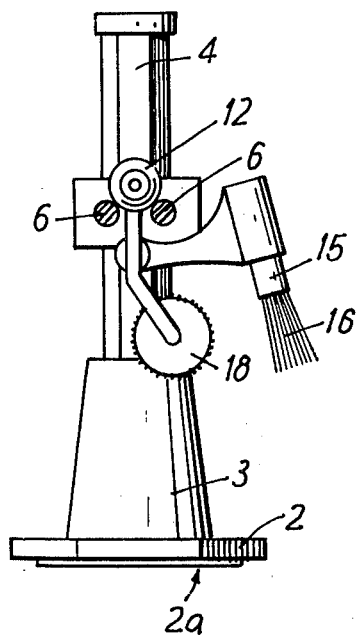
FIG. 2 is a section taken on the line II—II of FIG. 1.
FIG. 3 is an end elevation.
Figure 4:
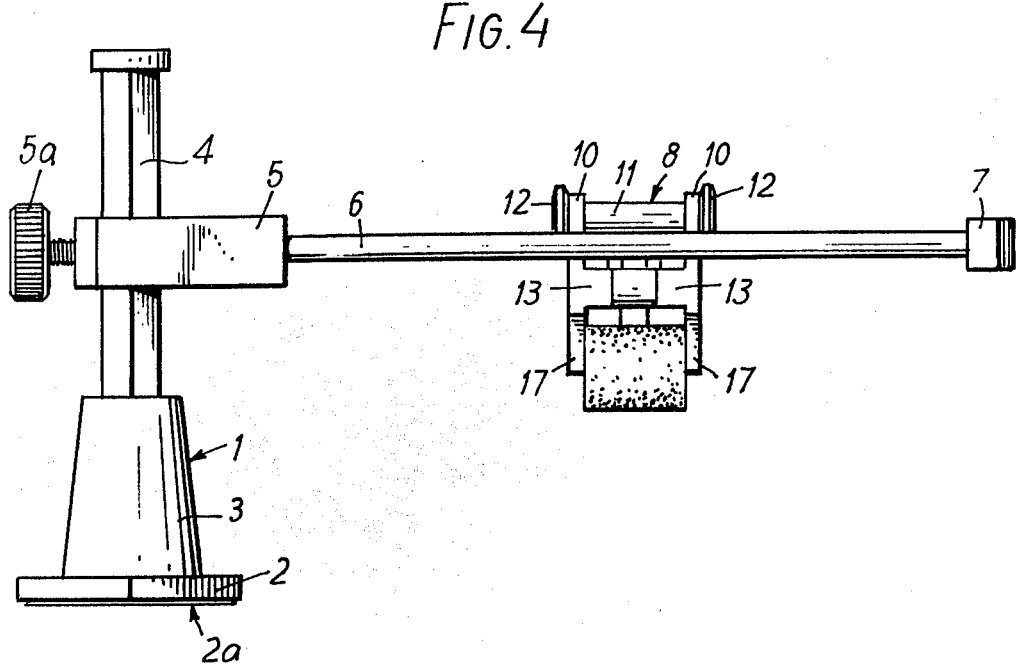
FIG. 4 is a side elevation.
Figure 5:
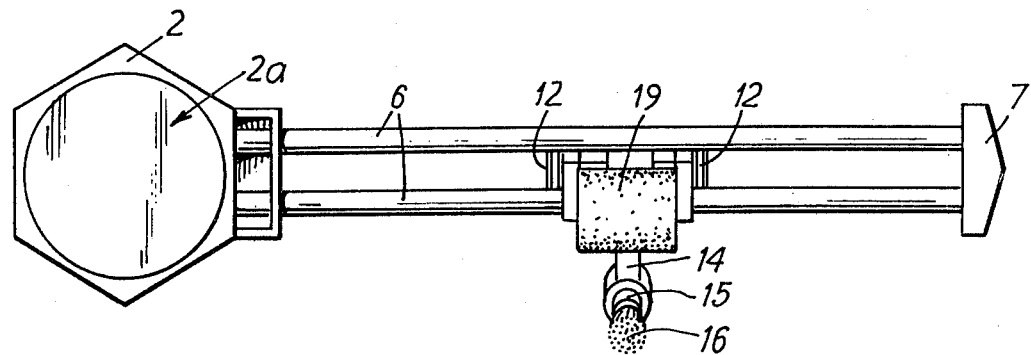
FIG. 5 is an underplan view.

The device comprises a mounting post indicated generally by reference 1 and including a base 2, a column 3, and a stem 4. The base 2 is adapted to be secured in any convenient manner on the upper surface of the usual deck of a gramophone. By way of example it may be secured by adhesive, e.g. by a double-sided adhesive washer 2a situated in a recess in its underside, or by a central bolt, or by one or more woodscrews etc. Alternatively, the base, or the mounting post as a whole, may be relatively heavily weighted as to stand in upright position.

On the stem 4 there is mounted a carrier block 5 which is slidably adjustable along the stem, and which can be locked in position by a finger screw 5a.

The stem 4 is secured in tight but rotatable frictional engagement in the column 3, or the column 3 is secured in tight but rotational frictional engagement on the base 2, to enable the carrier block 5 to be rotated, when required, with respect to the base 2.

The block 5 carries two parallel guide arms 6,6, and an end piece 7 is mounted on them as a push-fit, or secured with adhesive.

The two arms 6,6 serve as a guide for a slider indicated generally by reference 8. The slider comprises a depending body portion 9 which includes two upward extensions 10,10 which are apertured to receive a rod 11 on which are mounted two slider bearing discs 12,12 seating on the rods 6,6. The slider bearing discs 12,12 would advantageously be of a friction-reducing material such as P.T.F.E.

Centrally, the body 9 has two inward extensions 13,13 which carry respective inwardly extending lugs (not shown) serving as a journal for carrying a support 14 for a bristle-holder 15 with bristles 16.

The support 14 can swing freely in a vertical plane.

At the lower part of the body 9 there are provided respective side arms 17,17 which have inwardly-extending lugs (not shown) to serve as a journal for a roller 18 which has a surface covering 19 of a suitable static-removing fabric or other material, such as felt or the like. The slider can swing in a vertical plane, about the central axis of the discs 12, within the limits of arc imposed by contacting of the extensions 10,10 on the rods 6,6 and the slider as a whole can also move upwardly to lift the discs 12 above the rods 6.

In use, the device is mounted on the upper surface of the usual deck of the gramophone or record player, and when in its stored condition the block 5 is set into a position in which the rods 6 are beyond the edge of the turntable, so as not to interfere with the placing and removal of records. The frictionally rotatable mounting of the block 5 with respect to the box 2 ensures that the rods 6 remain in the position to which they are set.

When a record has been placed on the turntable, the rods 6 and block 5 are rotated, in a horizontal plane, so as to bring the rods into a position in which they are substantially radial to the turntable. At the same time, the vertical positioning of the block 5 on the stem 4 is adjusted until the rods 6 are of a suitable height above the record for the roller 18 to be contacting lightly the surface of the record, and for the bristles 16 to be engaging the grooves of the record. The slider is set initially in a position adjacent to the stem 4, with the bristles 16 and the roller 18 contacting the record face at its outer edge.

As the record rotates, during playing, the engagement of the roller 18 and of the bristles 16 with the grooves of the record is sufficient to cause the slider as a whole to track across the record. The slider obviously tracks across at the same rate as the usual stylus arm. When the record has been played, the block 5 is lifted up the stem 4, and the rods 6 and block 5 are swung through about 90° back into the stored position clear of the edge of the turntable.

The device has small dimensions, particularly because the length of the rods 6 needs only to be the radial dimension of the record, as distinct from the considerably longer length required for tangential tracking with a stylus arm or the equivalent.

We claim:

1. A device, for cleaning and removal of static electricity from a gramophone record when the record is on a record playing apparatus having a turntable rotatable with respect to a deck, comprising, in combination:
   (i) a mounting post for standing or securing on the deck in a position radially beyond the edge of the turntable, said mounting post including a substantially vertical elongated stem having a longitudinal axis,
   (ii) a carrier having an aperture receiving said stem, the carrier being slidable along the stem,
   (iii) a pair of substantially horizontal guide rods carried by and projecting from the carrier in parallel spaced relationship normal to the axis of the stem,
   (iv) a slider having a body portion which includes two upward extensions which are apertured to receive a rod on either end of which slider bearings are mounted,
   (v) a cleaning element for the record grooves and an element for removal of static electricity from the record both, carried on said slider.

2. A device, as claimed in claim 1, wherein the record cleaning element is a tuft of bristles, and wherein the static removing element is a rotatable fabric-covered roller.

3. A device, as claimed in claim 1, wherein the slider includes a first upper portion and a second lower portion pivoted to said first upper portion, said first upper portion extending with clearance between the guide arms and carrying the pair of slider elements, said second portion lying below the arms, said second portion carrying said cleaning element and said element for removal of static electricity.

* * * * *